United States Patent [19]

Pinard et al.

[11] Patent Number: 4,992,890

[45] Date of Patent: Feb. 12, 1991

[54] SYSTEM FOR PLOTTING AND SCANNING GRAPHIC IMAGES

[75] Inventors: Alward I. Pinard, Westford; Gary Girzon, Somerville; Andrew Warner, Harvard, all of Mass.

[73] Assignee: Intergraph Corporation, Huntsville, Ala.

[21] Appl. No.: 325,212

[22] Filed: Mar. 17, 1989

[51] Int. Cl.⁵ .................................................. H04N 1/04
[52] U.S. Cl. .................................. 358/474; 358/489; 358/495
[58] Field of Search ............... 358/474, 480, 481, 489, 358/493, 495; 250/578

[56] References Cited

U.S. PATENT DOCUMENTS

| | | | |
|---|---|---|---|
| 3,626,459 | 12/1971 | Haflinger et al. | 95/4.5 R |
| 3,744,039 | 7/1973 | Hrbek et al. | 340/173 |
| 4,000,493 | 12/1976 | Spaulding et al. | 346/1 |
| 4,260,997 | 4/1981 | Fukui | 346/108 |
| 4,270,149 | 5/1981 | Ohta et al. | 358/480 |
| 4,290,086 | 9/1981 | Spencer et al. | 358/293 |
| 4,296,441 | 10/1981 | Osasawara | 358/293 |
| 4,344,677 | 8/1982 | Stuermer et al. | 354/5 |
| 4,499,437 | 2/1985 | Blazey | 332/7.51 |
| 4,540,245 | 9/1985 | Bademian | 350/358 |
| 4,558,372 | 12/1985 | Culter | 358/264 |
| 4,585,938 | 4/1986 | Neuman et al. | 250/235 |
| 4,602,154 | 7/1986 | Tanigochi | 250/227 |
| 4,617,578 | 10/1986 | Nezu et al. | 346/108 |
| 4,691,212 | 9/1987 | Solcz et al. | 346/108 |
| 4,698,648 | 10/1987 | Takahashi et al. | 346/108 |
| 4,725,891 | 2/1988 | Manian | 358/285 |
| 4,739,416 | 4/1988 | Manian | 358/302 |
| 4,749,872 | 6/1988 | Asada et al. | 250/578 |
| 4,751,523 | 6/1988 | Froelich | 346/108 |
| 4,897,737 | 1/1990 | Shaley | 358/474 |

OTHER PUBLICATIONS

Goutzoulis, A. P., and Abramovitz, I. J., *Digital Electronics Meets Its Match*, IEEE Spectrum, Aug. 1988, pp. 21-25.

Primary Examiner—Edward L. Coles, Sr.
Attorney, Agent, or Firm—Bromberg & Sunstein

[57] ABSTRACT

A system for scanning or plotting a graphic image. The system deflects (10) a portion of the beam of light (18) by an amount dependent upon the value of a characteristic of a signal (12). A plurality of signals is generated (12), each having a different value of the characteristic. Portions of the beam are deflected along paths (15), such that the pixels created by one portion are disposed along one scan line, while pixels of the other portion are disposed along a successive scan line.

7 Claims, 11 Drawing Sheets

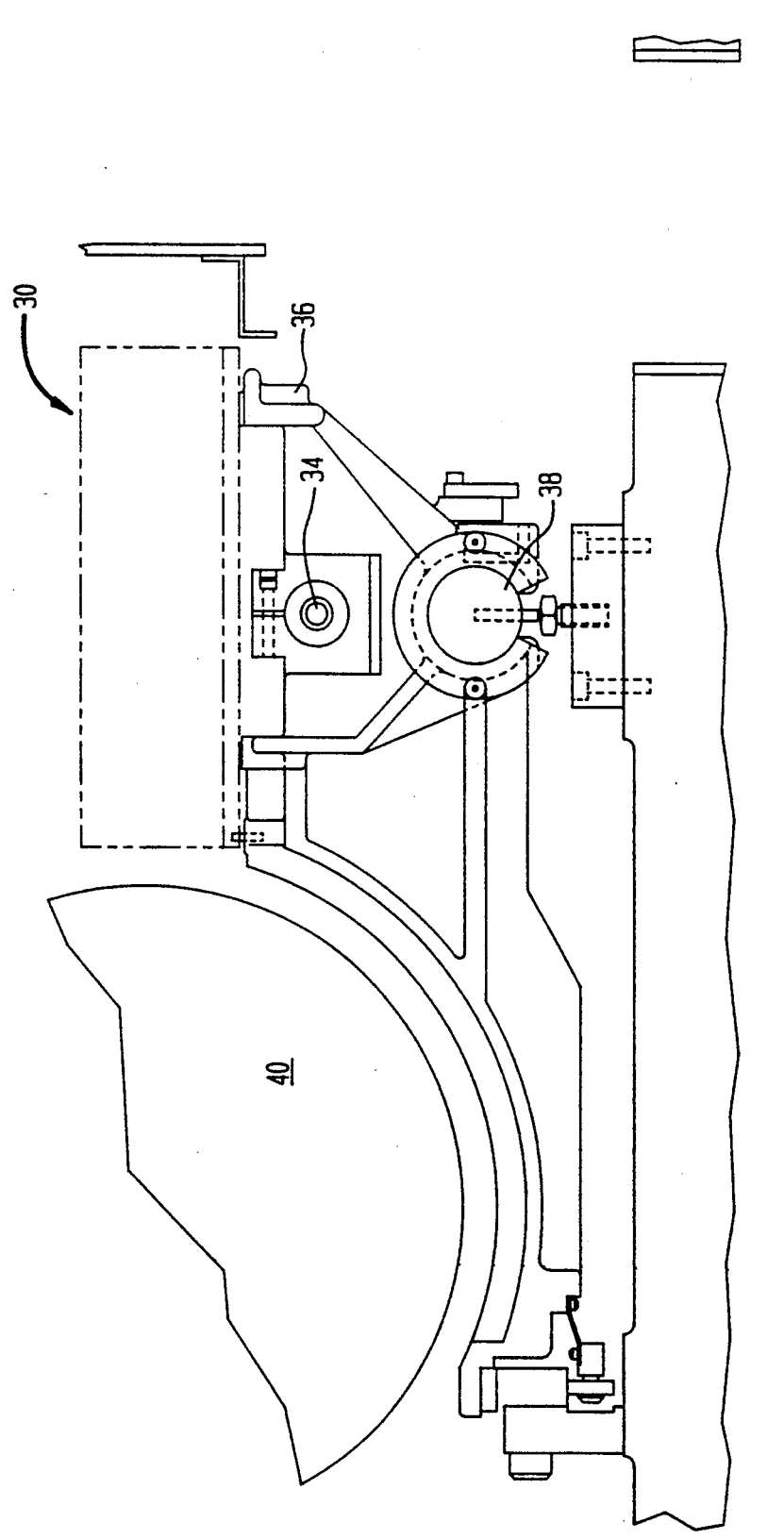

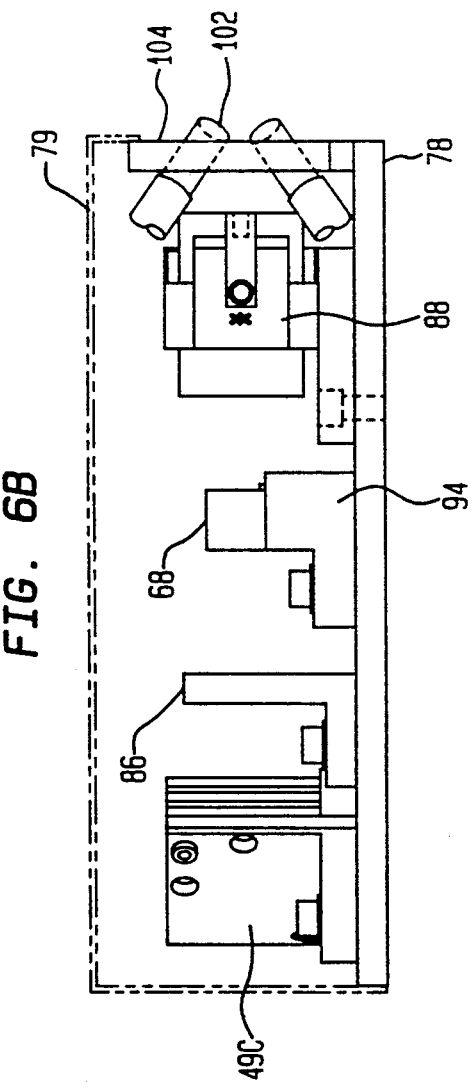
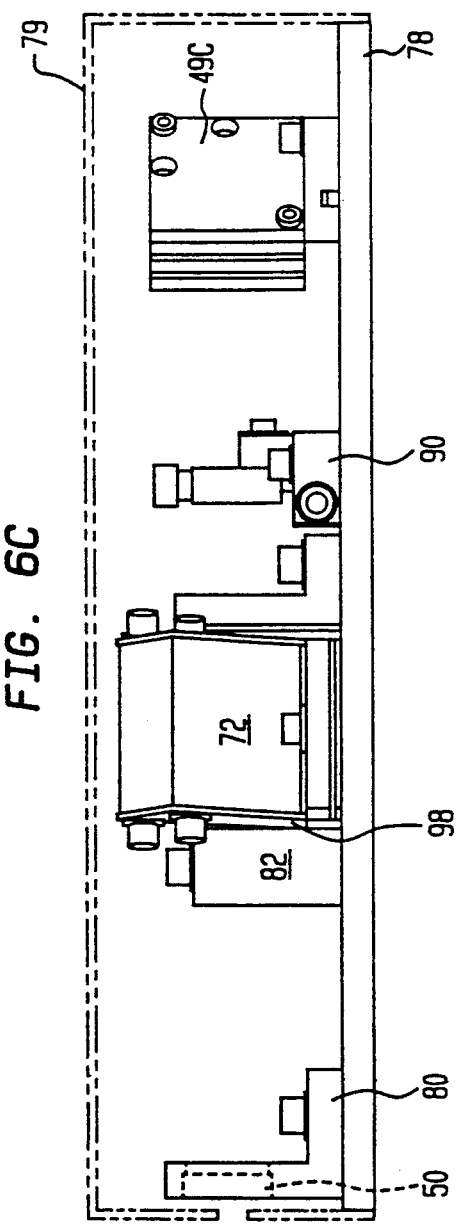

SYSTEM FOR PLOTTING AND SCANNING GRAPHIC IMAGES

TECHNICAL FIELD

The present invention relates generally to the field of processing graphic information and in particular to systems for plotting and scanning graphic images.

BACKGROUND ART

In prior art systems for plotting and scanning graphic images, a graphic image is plotted or scanned through the use of a beam of light that is caused to travel over a target, such as film or a document, in a precise, predetermined path. At each point along this path, the light beam, which is typically a laser, strikes a particular region on the target corresponding to an image pixel. In a plotting operation, the striking of this region of the film target causes it to become exposed. In a scanning operation, the striking of this region of the image target causes a certain amount of the light beam to be reflected. The reflected light is measured, and is used to generate image data that is stored and processed, as required.

In typical prior art systems, mechanical and electronic means are provided to move the light beam along the path while the target remains stationary. In other prior art systems, in addition to manipulating the light beam, the target is also moved to facilitate travel of the light beam along the predetermined path.

For example, in so-called "flatbed" systems, the target is mounted to a flat target surface, and the light beam is maneuvered over the target using movable mirrors or other means known in the art.

In an internal drum system, the target is mounted to the inside of a hollow cylindrical drum. Travel of the light beam along the target path is typically accomplished by moving a light beam assembly along the inside length of the drum, i.e., the "x axis," and rotating the light beam assembly, i.e., advancing the beam along the image's "y-axis."

Finally, in an external drum system, the target is mounted to the outside surface of a cylindrical drum. Similar to the internal drum system, means are provided to advance the light beam along both the image's x-axis and y-axis. In an external drum system, there is a choice as to how to integrate movement along the x- and y-axes. In one approach, the drum is allowed to complete an entire rotation before the light beam is advanced one unit along the length of the drum. This has the advantage of preserving orthogonality, but slows down processing because of alignment problems, and because a certain amount of "debouncing" time is required after the light beam has been advanced the one unit. In a second approach, both the drum and the light beam are advanced continuously. This results in a helical scan path around the cylinder, which has the advantage of speed, but creates a distortion in orthogonality.

All three prior art scanning/plotting systems suffer from a common drawback. The precision required in advancing the light beam along its predetermined travel path, and the spot size of the beam required for high resolution, impose speed limitations on scanning/plotting systems. Thus, even though the scanning or plotting data may be available and can be processed at extremely high rates, these limitations of a scanning/plotting system determine how fast a particular document can be processed.

SUMMARY OF THE INVENTION

The present invention addresses the problem of how to increase the processing speed of a scanning/plotting system. In a preferred embodiment of the present invention, at each point along the beam travel path, the light beam is rapidly deflected at a predetermined series of angles so that multiple pixels are struck at the target, rather than the one pixel struck in prior art devices. Further refinements to this preferred embodiment provides means whereby the duty cycle of the system is increased, and whereby orthogonality distortions are eliminated.

BRIEF DESCRIPTION OF THE DRAWINGS

FIGS. 4A, 4B, and 4C show, respectively, top, front, and left side views of a preferred embodiment of a scanning/plotting system according to the present invention.

FIGS. 6A, 6B, and 6C show, respectively, top, right side, and front views of a preferred embodiment of a mechanical housing for the optical assembly shown in FIG. 5.

DETAILED DESCRIPTION OF SPECIFIC EMBODIMENTS

The present invention provides a structure wherein it is possible to scan or plot an n-pixel wide "swath" at a target using only one beam of light. This is accomplished by employing a light beam deflector that, in response to a signal input, causes different degrees of deflection and attenuation of a constant light beam input. Thus, depending on the signal input, in a plotting mode various intensities of light are delivered to various pixel locations in the swath, causing the desired photogenic effect. Alternatively, in a scanning mode, a constant intensity of light is delivered to various pixel locations in the swath, and reflectivity data is recorded and analyzed using structures and methods known in the art.

One major advantage of the present structure is a manifold decrease in the amount of time required to plot or scan a given graphic image. The deflection of the light beam input is accomplished at megahertz frequencies. This is several orders of magnitude faster than the time required to mechanically manipulate the position of the target relative to the source light beam. Because the use of a deflected light source enables the system to plot multiple pixels virtually simultaneously, the present system requires only a fraction of the movement of the target relative to the scanning or plotting elements. Further, because only one source beam of light is used, the present system eliminates problems posed by multiple light source systems, such as spectrum and intensity matching, positioning, etc.

Figure 1:
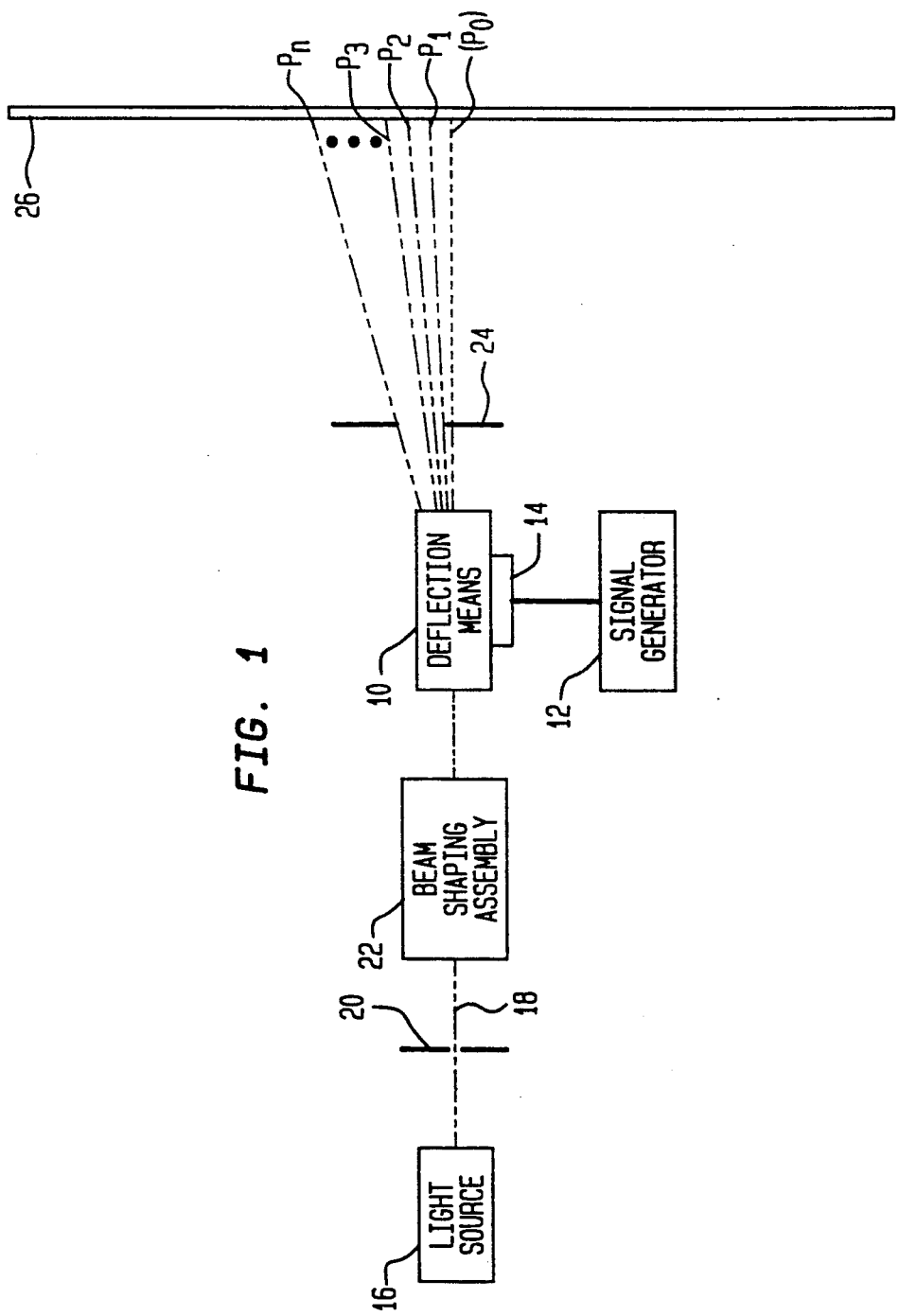
FIG. 1 shows a schematic setting forth the elements of a preferred embodiment of the present invention.

A simplified functional diagram of a scanning/plotting system according to the present invention is set forth in FIG. 1. Light beam deflection is accomplished by deflection means 10. In a preferred embodiment, an acousto-optical crystal is used for the deflection means.

Acousto-optical crystals are commercially available devices that are used for switching or for deflecting light beams. At rest, an A/O crystal will allow a beam of light to pass substantially undeflected. For the purposes of discussion, the path of an undeflected light beam will be designated as $P_0$.

When an A/O crystal is subjected to a vibratory waveform stimulus, however, a beam of light passing through the crystal will be deflected and attenuated depending upon the waveform characteristics of the stimulus. As set forth more fully in the literature, the degree of deflection of the passed beam of light will be a function of the frequency of the stimulus waveform. The degree of the crystal's transmissivity of the passed beam of light will be a function of the amplitude of the stimulus waveform. Typically, the greater the frequency of the stimulus waveform, the greater the degree of deflection; and the greater the amplitude of the stimulus waveform, the greater the transmissivity of the A/O crystal.

In addition, a number of engineering considerations are raised by the duration of the waveform stimulus. If the stimulus is of insufficient duration, the characteristics of the A/O crystal, especially in relation to the size of the light beam, will cause unacceptable distortion and/or insufficient intensity of the beam's spot. Thus, the requirement of a minimum duration for the waveform stimulus places a physical constraint on the amount of time required for the system to scan or plot an image. A way of minimizing the effect of this time constraint is discussed further below.

It is contemplated that the stimulus to the deflection means will be provided by a multi-band electrical signal generator 12, such as those generally known in the art. The various electrical signals generated are converted into vibratory waveforms by the use of a piezo crystal 14, or other similar transducing element. Because the transducing characteristics of piezo crystals are precisely defined, and because precise signal generators are generally commercially available, it is possible to deliver appropriate vibratory stimuli to the A/O crystal within narrow tolerances.

In a preferred embodiment, the source 16 for the beam of light 18 is a gas laser, such as commercially available Argon-Ion, He-Ne, or $CO_2$ lasers. The shape of the beam profile is defined by aperture 20 to conform to a desired pixel shape. Indeed, the entire system can be thought of as a means for imaging an aperture at desired positions.

The light beam 18 passes through beam-shaping system 22, which performs a scaling and focusing function, using techniques known in the art. Further details concerning a preferred embodiment for the optical assembly are set forth below.

As discussed above, the beam of light is deflected and attenuated by the deflection means 10 (i.e., the A/O crystal) when a vibratory stimulus is applied to the A/O crystal from the signal generator 12 through piezo crystal element 14. As further discussed above, when the A/O crystal is at rest, a beam of light passes through substantially undeflected and unattenuated.

In this embodiment, it is contemplated that the signal generator will deliver a discrete set of frequencies $f_1$ through $f_n$ with a corresponding set of paths $P_1$ through $P_n$ reaching target 26. (The locations at which these paths reach the target are hereafter called "target points" and are identified by the corresponding paths.) For example, the signal generator could be configured to deliver, as required, eight specific frequencies at a continuous range of amplitudes. These signals would be converted into vibratory stimuli that are applied to the A/O crystal. The lowest of the eight frequencies would cause the beam to be deflected to deliver light to target point $P_1$ at an intensity corresponding to the amplitude of the stimulus waveform. Each successively higher frequency in the set of eight frequencies would cause the beam to be deflected to successively higher target points $P_2$ through $P_8$.

In the present embodiment, a mask 24 is placed between the deflection means 10 and the target 26. The lower portion of the mask 24 is positioned to block light beam 18 when no vibratory stimulus is applied to the deflection means 10, that is, when the light beam travels on path $P_0$. (In plotting, it should be remembered that the intensity of the beam on path $P_0$ is not modulated by the A/O device, so this beam is of less utility.)

An important characteristic of an A/O crystal is its ability to map a vibratory stimulus having multiple frequency components into multiple light beam outputs. Thus, if the stimulus has two different frequency components, the incoming beam will be split into two separate first order beams, each deflected by an angle dependent on the frequency. However, there are also produced non-first order and heterodyned beams. These extraneous beams are also blocked by mask 24.

The frequency mixing property of an A/O crystal can be used to increase the speed of the system. As discussed above, the requirement of a minimum duration for the vibratory waveform stimulus places a physical constraint on the speed of the system. However, if two distinct frequency components are applied to the crystal at the same time, light will be simultaneously directed to two separate target points. Thus if multiple frequency components are used simultaneously, the system's speed may be increased by the same multiple. If the frequencies generated by the signal generator are correctly chosen, any products of the mixing of the multiple frequencies will either be blocked by the mask 24 or be of insufficient intensity to affect results adversely. Any power loss attributable to mixing of the frequencies is compensated for using means known in the art, for example, by appropriately decreasing the amplitude of the stimulus when only one frequency is present or increasing the intensity of the input beam when mixing is present.

In a preferred embodiment, target 26 is a rotating drum on which is mounted the film on which an image is plotted, or a graphic image which is being scanned. As the drum rotates, the beam deflection assembly is mechanically advanced along a lead screw down the length of the drum. In a preferred embodiment, an image is processed in a helical swath around the surface of the target cylinder. The deflected beam's spot is one pixel, and is addressable at half-pixel positions. In one embodiment, a typical pixel width is one mil (0.001 in.), addressed at every half-mil interval. In this embodiment, the width of the swath being scanned or plotted is eight pixels, or four mils (0.004 in.).

Figure 2A:
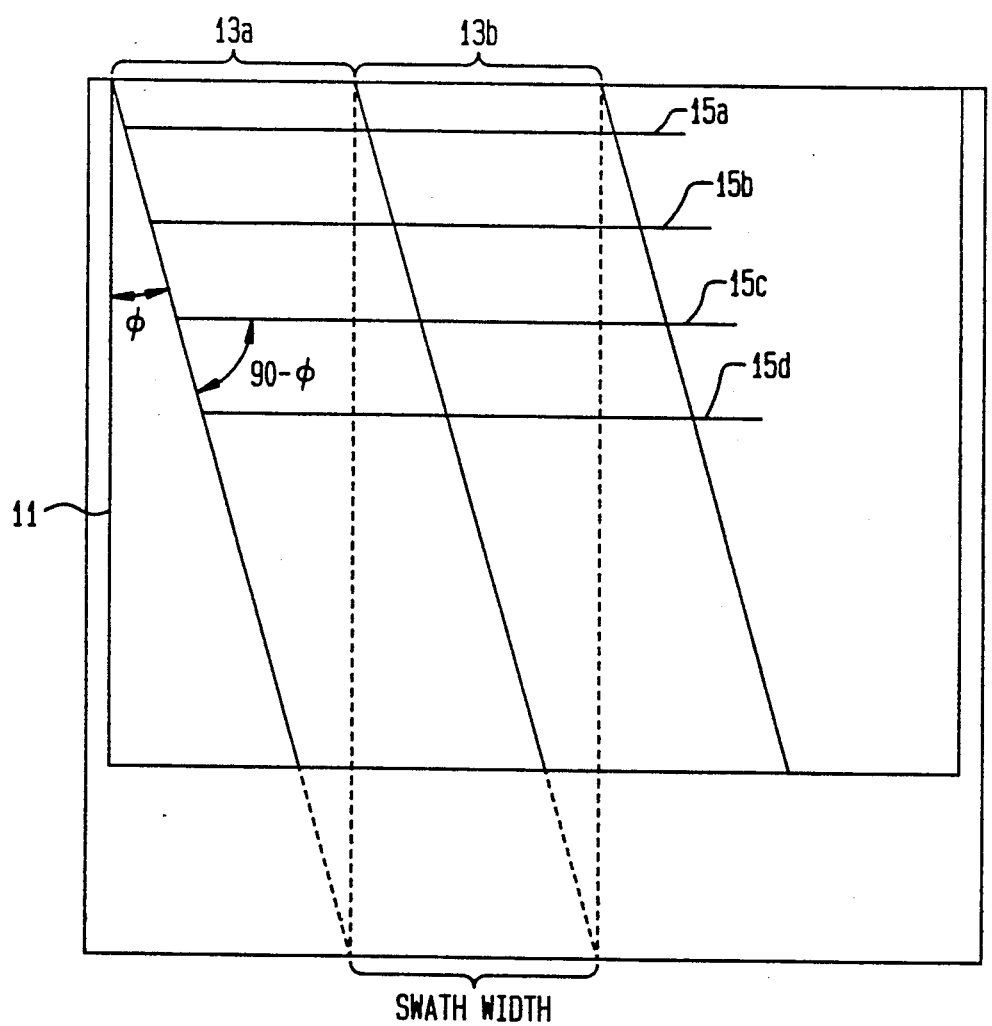
FIGS. 2A and 2B depict orthogonality error and its correction in a preferred embodiment of the present invention.

Using a standard machine alignment, orthogonality error is introduced when the image is helically processed around the surface of the target cylinder. As shown in FIG. 2A (in exaggerated fashion), because there is a slight angle $\phi$ between the edge of the film 11 and the plotting path (including swaths 13a, 13b . . . from successive rotations, each swath including successive horizontal scans along a portion of horizontal scan lines 15a, 15b, 15c . . . ), the resulting image will be distorted. This error is on the order of a swath width, here four mils (0.004) per rotation, which is considered unacceptable in many plotting and scanning applications.

Figure 2B:
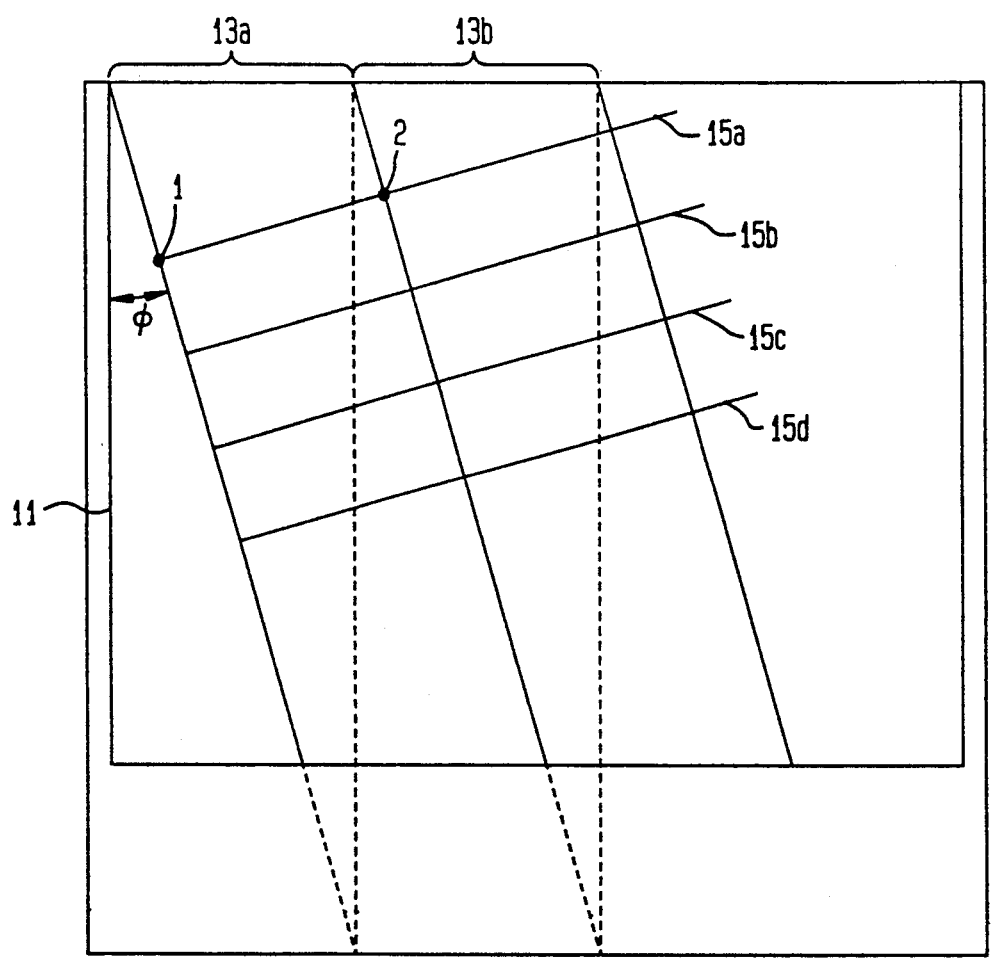

Although this problem could be addressed using software or other electronics-based solutions, it has been found that one easy solution is mechanical: As shown in FIG. 2B, to eliminate the distortion in orthogonality, the drum's axis of rotation is tilted with respect to the direction of horizontal scan (indicated by successive horizontal lines 15a, 15b, 15c . . . ). It will be seen that this tilting of the drum has utility independent of the particular multi-pixel plotting/scanning structure described herein. The tilting of the drum would be useful whenever an image is processed helically around the surface of a cylinder or in other situations where the scanning path destroys orthogonality by introducing a skew angle.

Another solution to this problem is to modify electronically the relative position at which each swath commences plotting on each rotation of the drum.

As shown in FIG. 2B, the tilting of the drum axis (or the electronic equivalent) causes the plotted image to be skewed on film that is mounted normally on the drum. This problem can be solved by modifying the mounting of the film on the drum so that one of its edges is parallel to the direction of horizontal scan, rather than to the axis of drum rotation.

Because of the continuous rotation of the target drum, it will be seen that sequentially providing vibratory stimulation at the eight signal generator frequencies to create a swath along a line parallel to the axis of rotation of the drum will produce a skewed line. In order to compensate for this skew, the plane of deflection is tilted slightly. Such a tilted deflection plane, if used while the drum were to remain stationary, would result in an image such as that illustrated in FIG. 3A, wherein each square represents a pixel. The timing of the drum rotation, together with the tilt in the deflection plane, would "pull" the eight depicted pixels into a straight line.

Figure 3A:
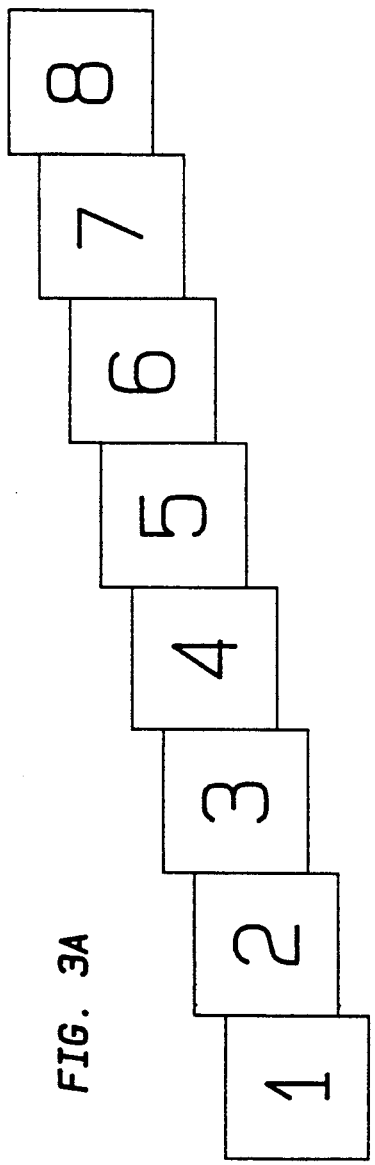
FIGS. 3A and 3B depict a target swath when the target is stationary, and when the target is in motion in a preferred embodiment of the present invention.
Figure 3B:
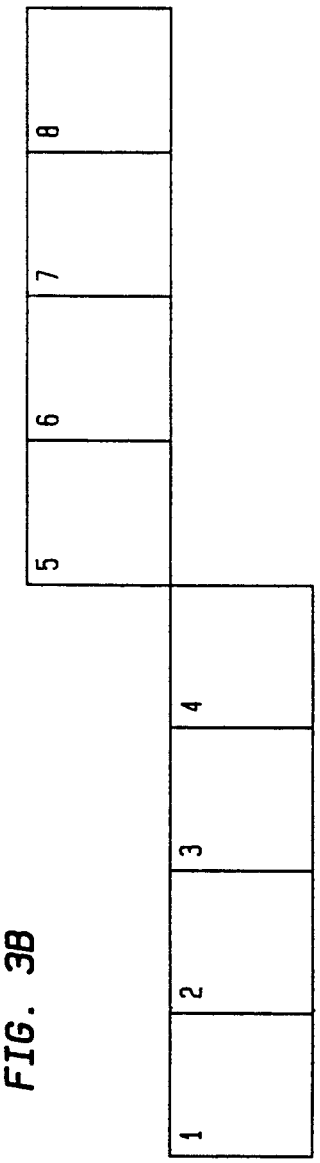

In a preferred embodiment of the invention, two beams are used simultaneously as described above to increase system speed. Corresponding to each of the eight pixels of FIG. 3A is a frequency input $f_1 \ldots f_n$ to the A/O crystal. Two frequency inputs are provided simultaneously in successive pairs paced four frequencies apart. In other words, the A/O crystal causes light to be delivered in turn to pixels 1 and 5, 2 and 6, 3 and 7, and 4 and 8. The effect of the timing of the changes between these four sets of pixels, together with the effect of the tilt, is such that pixels 1-4 are disposed along one scan line, and pixels 5-8 are disposed along the successive scan line. This arrangement is illustrated in FIG. 3B. In a preferred embodiment of the present invention, it has been found that one possible set of frequencies that could be applied would be a frequency of 187.5 MHz for $f_1$ and 17.5 MHz increment higher each successively higher frequency. It should be noted that it is possible to use other frequencies and other positional combinations to arrive at similar results. The frequencies and dimensions expressed herein are also scalable.

Prior to being fed into the present scanning system, plotting data is broken up into scan lines, and each scan line is broken up into eight pixels with associated intensities. These are then in turn broken up into two groups of four pixels which are then staggered one scan line apart, using conventional buffering techniques. Further details concerning the construction of a preferred embodiment of a scanning and plotting system are set forth below.

Figure 4A:
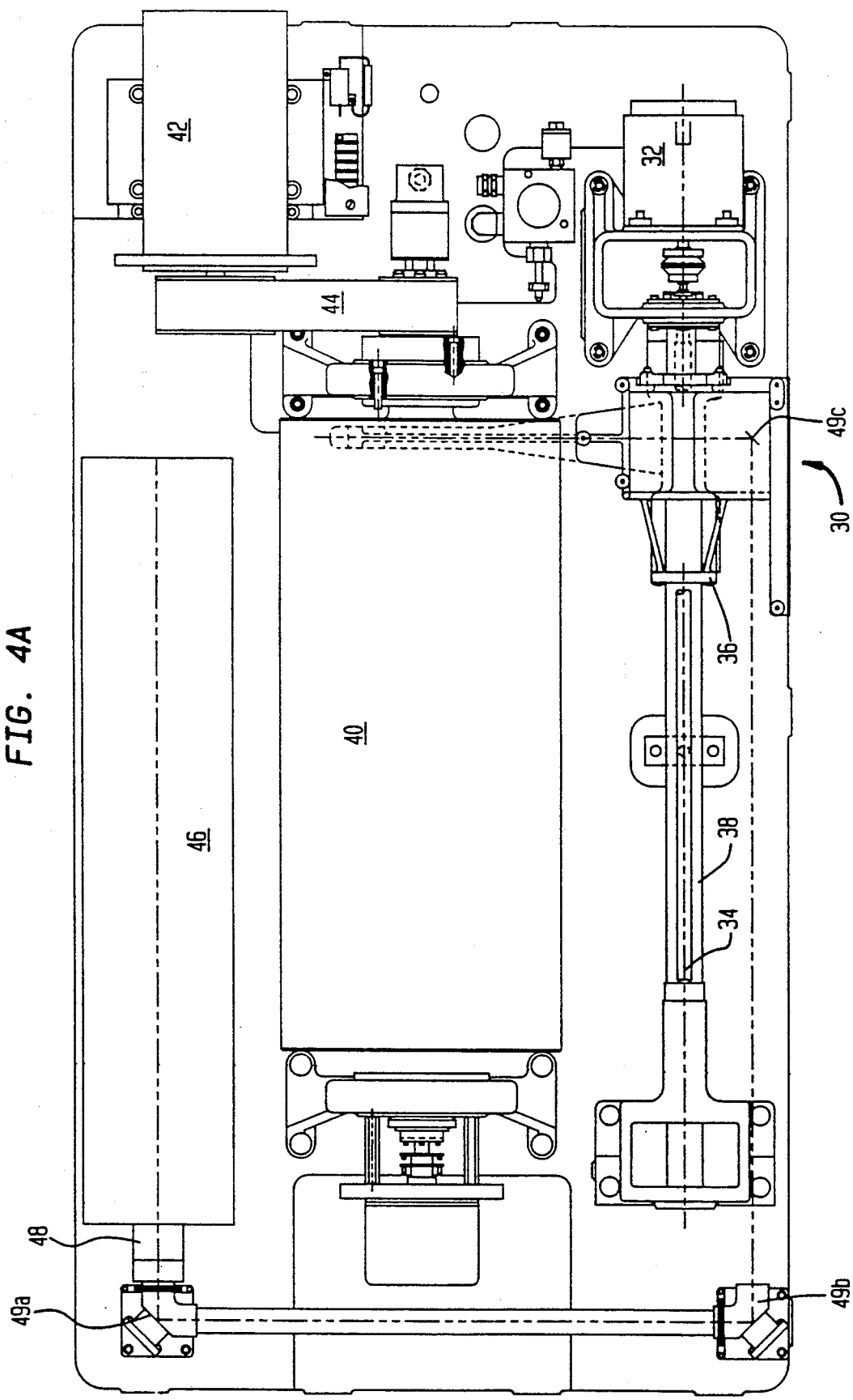
Figure 4B:
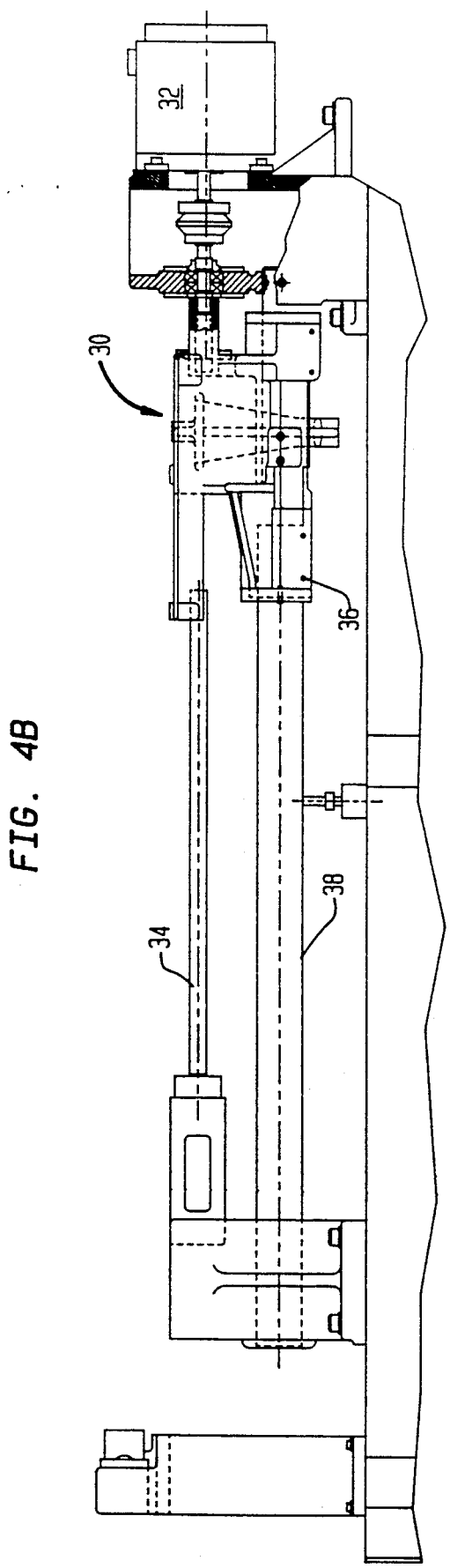

FIGS. 4A, 4B, and 4C show, respectively, a top view, a front view, and a left side view of a preferred embodiment of the present invention. The deflection means is housed within head assembly 30, which is seated on carriage assembly 36. Stepper motor 32 actuates lead screw 34, the rotation of which causes carriage assembly 36 to advance along guide rail 38, substantially parallel to drum 40. Drum 40 is rotated by motor 42, which drives the drum via belt assembly 44. As discussed above, the rotational axis of drum 40 is tilted slightly to eliminate the skew angle with respect to the direction of horizontal plot.

A gas laser 46 provides a constant-wavelength light source. The head of the laser 48 is equipped with an aperture of appropriate size and shape. As mentioned above, this aperture is actually imaged onto the target point, so the design of the aperture is important to the proper functioning of the system. However, numerous acceptable aperture designs are well known in the art.

In order to facilitate alignment and to save space, commercially available mirrors 49a, 49b and 49c are used to bend the light beam path. As shown in later figures, and as discussed further below, optics are provided to scale and focus the light beam using techniques known in the art.

The operation of the motors 32 and 42, as well as the deflection means contained within head assembly 30 are controlled by a combination of analog and digital circuitry and microprocessor technology as set forth below. The interface between the controller electronics and the motors and the deflection means are well known in the art.

Figure 5:
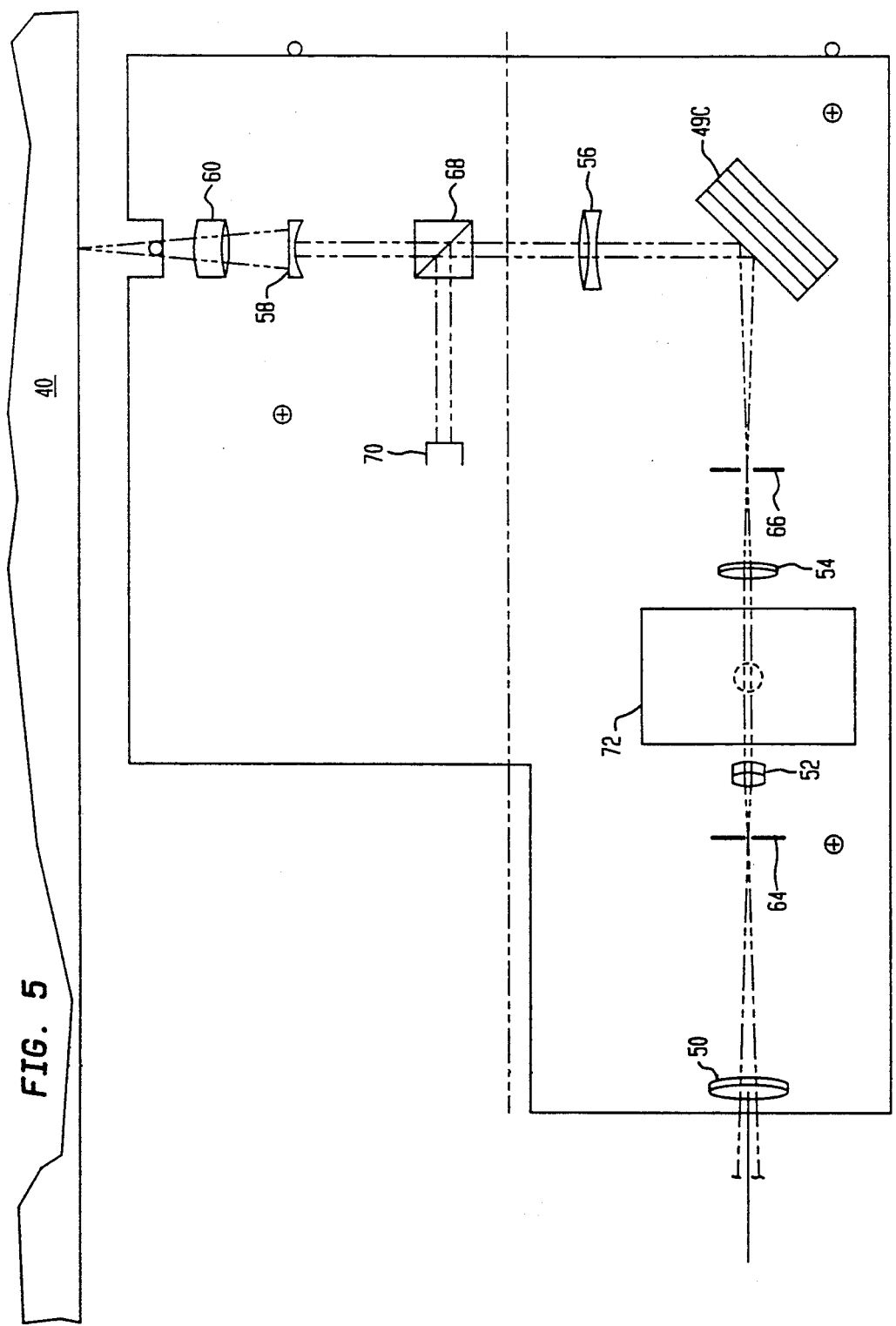
FIG. 5 shows a schematic of a preferred embodiment of an optical assembly for use in the structure depicted in FIGS. 4A, 4B, and 4C.

FIG. 5 shows a preferred embodiment of the optics contained within a plotting and scanning head according to the present invention. A series of commercially available lenses 50, 52, 54, 56, 58, and 60 are disposed along the optical path, using techniques known in the art. As mentioned above, the purpose of these lenses is to scale and focus the aperture imaged by the source gas laser. In the present embodiment, it has been found that the following specifications can be used for the lenses: lens 50 - f 60×18 mm; lens 52 - f 12×7 mm; lens 54 - f 25×12 mm; lens 56 - f 80×18 mm.

In addition, a supplementary aperture 64 is provided to mask off any incidental beams of light that might interfere with the clarity of the imaged aperture. The aperture 66 performs the masking of undesirable deflected light beams, as discussed above, in connection with item 24 of FIG. 1. A commercially available mirror 49c is used to bend the source beam path.

In a preferred embodiment of the present invention, a commercially available cube beam splitter 68 is provided to split off a portion of the source beam into photodetector 70. The purpose of this beam splitter and photodetector is to provide a feedback mechanism, facilitating the timing and control functions performed by the system electronics using means known in the art. In addition, the use of the beam splitter and photodetector also permits the system to detect a fault in the optical path, and to maintain constant beam intensity. In particular, the photoelectric output is used to adjust the amplitude of each of the frequencies $f_1$ through $f_8$ provided to the A/O device in order to assure a uniform pixel intensity for any given data input.

As discussed above, the deflection of the source beam is accomplished by the use of deflection means 72 responsive to a signal generator. In a preferred embodiment of the present invention, deflection is provided by a commercially available acousto-optical modulator (AOM). As further discussed above, the AOM's deflection axis is tilted to allow for movement of the drum between changes in deflection positions.

The deflected beam is passed through the aperture 66 and is directed by mirror 49c to the surface of the drum 40 upon which is mounted the scan or plot target.

Figure 6A:
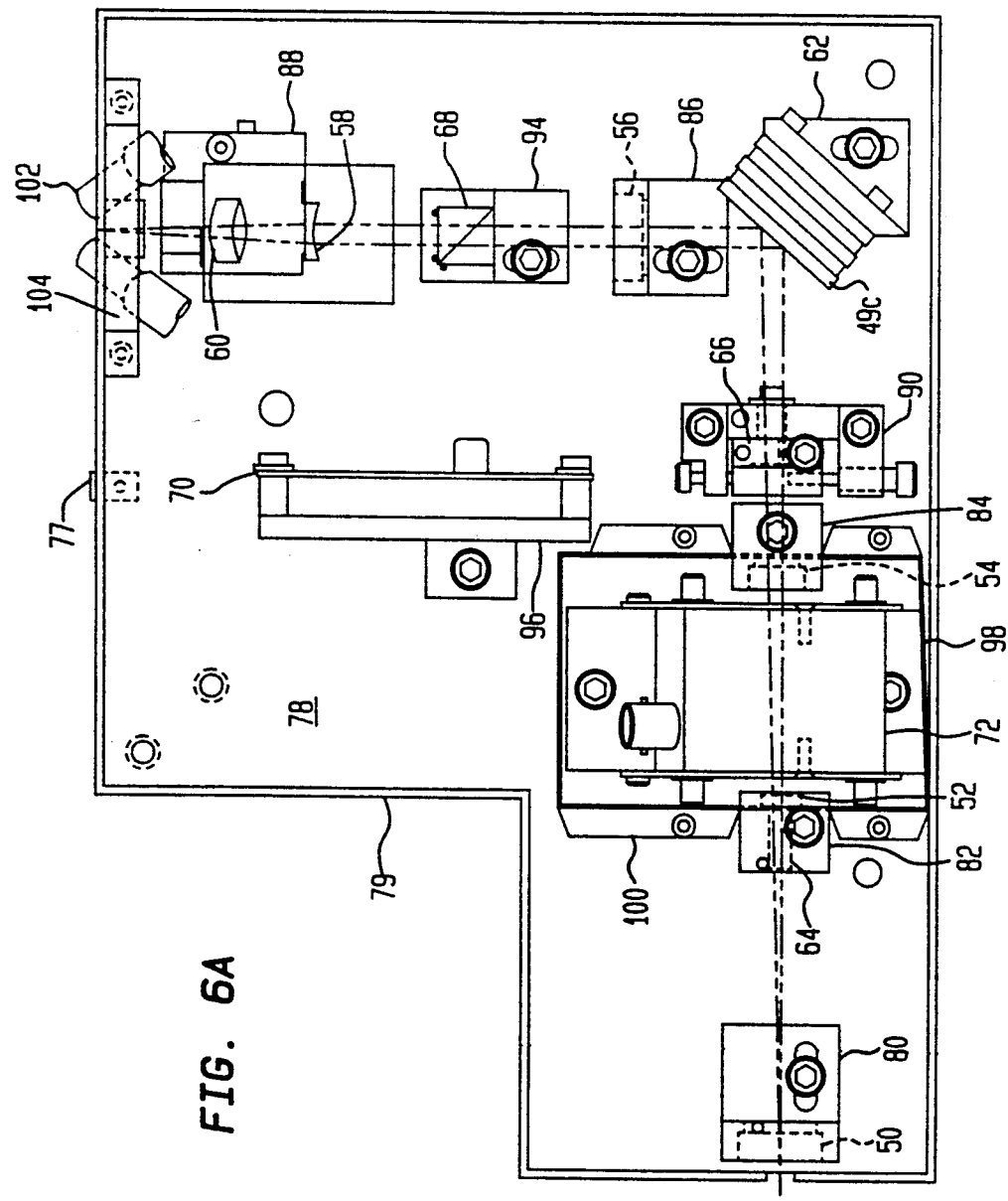

FIGS. 6A, 6B, and 6C set forth, respectively, top, right side, and front views of a preferred embodiment of a mechanical structure for housing the optics depicted in FIG. 5. All of the component elements are disposed between base plate 78 and cover 79, which are grounded by ground clip 77. Lenses 50, 52, 54, 56 are mounted respectively in housings 80, 82, 84 and 86. Magnifying and focusing lenses 58 and 60 are mounted together in assembly 88. Aperture 64 is mounted into the same housing 82 as lens 52. Adjustable aperture assembly 90 houses aperture 66. Also provided is a housing and mirror mount 92 for mirror 49c. Beam splitter 68 is mounted onto housing assembly 94, and laser detector 70 is mounted onto laser detector housing 96. Deflector means 72 is mounted into deflector mounting assembly 98. The deflector mounting assembly 98 is provided with an EMI shield 100.

For scanning purposes, fiber-optic bundles 102 are mounted onto a housing 104 in a substantially square array about the exiting beam of light. The fiber-optic bundles point to the target area from different angles, and are used to pass reflection data back to a photodetector, using means known in the art. It will be appreciated that scanning can be accomplished using means known in the art wherein a single beam illuminates a pixel of the target along a specified path and the reflection data is appropriately recorded and processed. In accordance with the present invention, scanning may be achieved by using the A/O device to sequentially illuminate adjacent pixels in a fashion analogous to that described above in connection with plotting Orthogonality errors can be eliminated by the mechanical or electronic means described above.

As shown in FIG. 6C, the acousto-optical modulator 72 is mounted onto the deflection housing 98 at a slight angle. As discussed above, the tilting of the AOM is desirable because it compensates for the movement of the drum between changes in position of the deflected beam.

Figure 7:
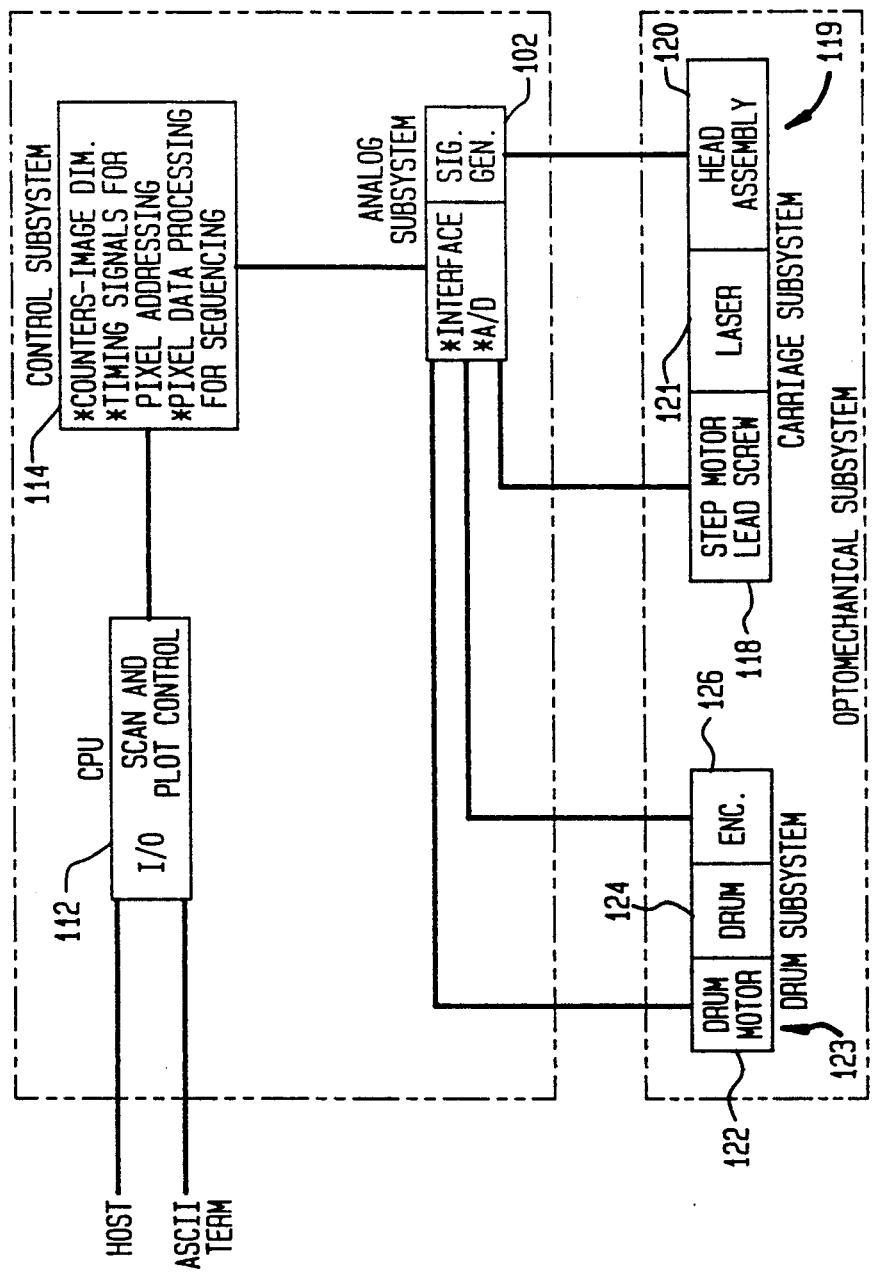
FIG. 7 shows a block diagram of the various subsystems in a preferred embodiment of the present invention.

FIG. 7 shows a block diagram of a preferred embodiment of the primary subsystems of a plotter/scanner according to the present invention. These subsystems include a CPU 112, control subsystem 114, carriage subsystem 119, drum subsystem 123 and analog subsystem 102. The CPU 112 handles input of plot data and output of scan data and has software to generate raster data for the plotter that is sent via the control subsystem; the software also handles scan data from the control subsystem. The CPU controls the overall plot-scan cycle by sending appropriate instructions to the control subsystem. The control subsystem 114 controls the dimensions of the image to be plotted or scanned by appropriate counters, and has hardware to generate timing signals, based on inputs from sensors in the drum and carriage subsystems, to control pixel addressing via the counters. The control subsystem also processes the pixel data from the CPU (during a plot) and the analog subsystem (during a scan) to assure proper sequencing as discussed above in connection with FIGS. 3A and 3B. The analog subsystem 102 includes a multifrequency signal generator of the type described above to drive the A/O crystal, interface hardware for data transfer to the control subsystem and to the drum and carriage subsystem, and analog to digital conversion of scan data. The drum subsystem 123 includes the drum 124 on which plotting or scanning is performed, the drum motor 122, and the shaft encoder 126, which generates pulses used to establish drum position. Film is held onto the drum by a vacuum generated by an external pump system. The carriage subsystem 119 comprises the head assembly 120 including A/O device and related optics, the laser 121, and step motor and lead screw assembly 118. A linear encoder may be used in conjunction with the lead screw assembly 118 if desired for further positional accuracy.

In one embodiment, the drum speed may be 44 revolutions per second, and the drum circumference is 28.8 inches. With a spacing of 2000 pixels/inch, a scan line can be exposed approximately every 400 nanoseconds. A $20'' \times 26''$ plot can be achieved in less than two minutes, a result that is eight times faster than with a single-beam head and the same drum size and speed.

What is claimed is:

1. An improved system, for plotting a graphic image, of the type having light source means for providing a beam of light, a scanning head, and first and second axis translation means for translating the scanning head along first and second axes respectively in relation to an image being plotted, wherein the improvement comprises:
    deflection means, disposed in the scanning head, having an electrical input, for deflecting along a path a portion of the beam of light by an amount dependent upon the frequency of a signal that is present at the electrical input;
    signal generator means for generating a plurality of signals, each having a different frequency and for supplying each of the signals to the deflection means, such generation means including means for modulating separately the amplitude of each of the plurality of signals in response to a corresponding plurality of generator inputs, so that the amplitude of a given generator input controls the amplitude of the portion of the beam deflected by the frequency signal to which the generator input relates;
    wherein the plurality of signals includes a first set of signals below an established frequency and a second set of signals above the established frequency, and the signal generator means includes means for supplying simultaneously to the deflection means a signal from the first set and a signal from the second set in successive pairs of signals so as to cause scanning of portions of the beam of light parallel to the second axis simultaneously at two different and proximate locations on the first axis.

2. A system according to claim 1, wherein the graphic image is plotted on a document, the first axis is disposed circumferentially about a cylinder, on which the document is situated, the cylinder having a central axis, the second axis is disposed approximately parallel to the central axis, and the first and second axis translation means are collectively operative to cause the document to be plotted along a helical path by the scanning head, so that the path of deflection of a portion of the beam of light, resulting from operation of the system and in response to successively higher frequency signals in any one of the first set of signals and the second set of signals, lies in a direction approximately parallel to the second axis.

3. A system according to claim 2, wherein the width of the helical path along the second axis is approximately equal to sum of the effective lengths of the deflection paths along the second axis caused by the deflection means in response to the lowest and highest frequency signals in each of the first and second sets of signals.

4. A system according to claim 1, further comprising:
intensity detection means for providing a signal related to the intensity of the light beam after it has been deflected by the deflection means; and
intensity control means, connected to the intensity deflection means and the signal generation means, for modifying the signal generation means output so as to achieve a substantially constant intensity of the light beam after it has been deflected by the deflection means regardless of the extent of its deflection.

5. An improved system, for plotting a graphic image on a document having first and second document axes respectively, the system being of the type having light source means for providing a beam of light, a scanning head, and first and second axis translation means for translating the scanning head along first and second axes respectively in relation to the image being plotted, wherein the first axis is disposed circumferentially about a cylinder, on which the document is situated, the cylinder having a central axis, and the second axis is disposed approximately parallel to the central axis and wherein the improvement comprises:
swath exposure means, disposed in the scanning head, for independently exposing each pixel in a linear swath of pixels in the graphic image; and
wherein the first and second axis translation means are collectively operative to cause the document to be plotted along a helical path by the scanning head, so that the direction of the linear swath lies in a direction approximately parallel to the second axis.

6. A system according to claim 5, wherein the second axis is disposed at such an angle to the central axis as to be perpendicular to the direction of the helical path.

7. A system according to claim 6, further comprising mounting means for mounting the document on the cylinder in such fashion that one of the document axes is parallel to the second axis rather than to the central axis.

* * * * *